United States Patent Office 2,975,033
Patented Mar. 14, 1961

2,975,033

PROCESS FOR PREPARATION OF HYDROGEN PEROXIDE

Gerhard Käbisch and Ekkehard Richter, Rhinefelden, Baden, and Albert Gross, Frankfurt am Main, Germany, assignors to Food Machinery and Chemical Corporation No Drawing. Filed Nov. 21, 1957, Ser. No. 697,784

Claims priority, application Germany Nov. 24, 1956

6 Claims. (Cl. 23—207)

This invention relates to the manufacture of hydrogen peroxide by the alternate, successive, hydrogenation of an alkylated anthraquinone to form the corresponding anthrahydroquinone, and oxidation of the anthrahydroquinone formed thereby, and particularly to such a process wherein the oxidation and reduction are carried out in a new solvent.

Heretofore, many solvents have been suggested for use in the manufacture of hydrogen peroxide by the anthraquinone process, that is by the alternate hydrogenation and oxidation of, respectively, the substituted anthraquinones and the hydrogenated derivatives thereof, and extraction from the working solution of these compounds, of hydrogen peroxide which is produced by oxidation of the anthrahydroquinone. However, by reason of the large number of requirements for a suitable solvent for use in the anthraquinone process, most of the solvents which have been suggested previously have been found unsuitable. In order that a solvent be satisfactory in this operation, it should have as many as possible of the following ideal properties:

(1) It must dissolve a large amount of the anthraquinone.
(2) It must dissolve a large amount of the anthrahydroquinone.
(3) It must be chemically inert, particularly to oxidation and hydrogenation.
(4) It must be a low-cost, commercial product, free of contact poisons.
(5) It must have a high boiling point and a high flash point.
(6) It must have a low degree of solubility in water.
(7) Its distribution coefficient for hydrogen peroxide must be high.

This list of important properties could be enlarged upon. By reason of the great number of properties required in a solvent for the anthraquinone process, mixtures of solvents commonly are used exclusively in an endeavor to approximate the desired properties of an ideal solvent by a suitable combination of the individual solvent constituents.

It has now been found that certain aromatic alcohols and their esters possess many of the desired properties of an ideal solvent for use in the anthraquinone method of producing hydrogen peroxide. This fact is quite surprising since previously the aliphatic and alicyclic alcohols and their esters were emphasized as being particularly suitable solvents.

The aliphatic and alicyclic alcohol solvents presently in use in industry have been found to dissolve the anthrahydroquinones in sufficient quantity, but to fail as solvents for the anthraquinones. However, the solvents of the present invention have the advantage that they not only dissolve large amounts of the anthrahydroquinone, which would be predicted from their chemical natures, but also that they dissolve the anthraquinones in sufficiently large quantities, as can be seen from the following table of comparison:

Table I

| Solvent | Grams ethylanthraquinone per 100 ml. solvent, 20° C. |
| --- | --- |
| Prior art solvents: | |
| (1) Ethyl alcohol | 0.8 |
| (2) Heptanols—nonanols | 2-3 |
| (3) Cyclohexanol acetate | 4.1 |
| Solvents of this invention: | |
| (4) Benzyl alcohol | 17 |
| (5) β-phenylethyl alcohol | 15.5 |
| (6) β-phenylethyl acetate | 17.6 |
| (7) β-phenylethyl propionate | 12.5 |
| (8) Methoxyphenylethyl acetate | 8.5 |
| (9) Tolylethyl isobutyrate | 14.3 |

As used herein, the term aromatic alcohols and their esters shall mean compounds which consist of a suitably substituted benzene ring or naphthalene unit with one or several side chains which have at least one alcohol group which in turn may be esterified. The length of any side chain shall not be more than 10 carbon atoms, since otherwise the viscosity of the compound will become too great. The β-phenylethyl alcohol and the β-tolylethyl alcohol, their esters, and their simple derivatives, are preferred for use herein.

The solvents of this invention are suitable for dissolving both the anthraquinone and the anthrahydroquinone forms of the working compound, so that they can be used as a sole solvent in the anthraquinone process. This permits simplification in the makeup of the working solution, that is the solution of the anthraquinone and the solvent. Additional advantages possessed by the solvents of this invention are their high melting points and flash points, and their excellent hydrogen peroxide distribution coefficients, that is the ease with which hydrogen peroxide can be separated from them.

The herein solvents also can be used advantageously in admixture with other solvents, and are likewise suited for use with other working compounds besides ethylanthraquinone, for example with other alkylated anthraquinones, e.g. tertiary butyl anthraquinone, or anthraquinones having one or more alkyl groups, or with halogenated anthraquinones.

What is claimed is:

1. Process for the manufacture of hydrogen peroxide by alternate, successive, hydrogenation of alkylated anthraquinones, oxidation of the corresponding anthrahydroquinones formed by said hydrogenation, and extraction with water of hydrogen peroxide produced by said oxidation, wherein said anthraquinones and anthrahydroquinones are employed as solutes in a working solution which contains as a solvent constituent a solvent from the group consisting of the aromatic alcohols and their esters of the following general formula:

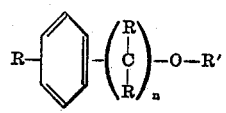

wherein $n = 1$ to 2,

R is from the group consisting of hydrogen, alkyl groups having 1 to 2 carbon atoms, and alkoxy groups having 1 to 2 carbon atoms, R' is from the group consisting of hydrogen and α-acyl groups having 1 to 4 carbon atoms, and the total number of carbon atoms in each of the side chains R— and

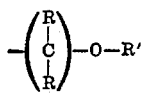

is less than 11.

2. Process according to claim 1 wherein the solvent constituent is β-tolylethyl alcohol.

3. Process according to claim 1 wherein the solvent constituent is β-phenylethyl alcohol.

4. Process of claim 1 wherein the solvent constituent has the following general formula:

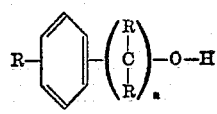

wherein $n=1$ to 2,

R is from the group consisting of hydrogen, alkyl groups having 1 to 2 carbon atoms, and alkoxy groups having 1 to 2 carbon atoms, and the total number of carbon atoms in each of the side chains R— and

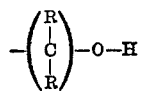

is less than 11.

5. Process of claim 1 wherein the solvent constituent has the following general formula:

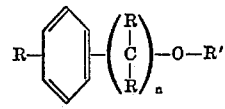

wherein $n=1$ to 2,

R is from the group consisting of hydrogen and alkyl groups having 1 to 2 carbon atoms, R' is an α-acyl group having 1 to 4 carbon atoms, and the total number of carbon atoms in each of the side chains R— and

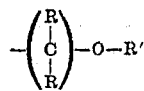

is less than 11.

6. In a process for producing hydrogen peroxide by the reduction of a working intermediate of the group consisting of the alkylanthraquinones, their tetrahydro derivatives and mixtures thereof dissolved in a working solvent mixture containing at least two solvent components, and the resulting anthrahydroquinone solution is oxidized to produce hydrogen peroxide and to reform the starting anthraquinone, the improvement comprising employing an aralkyl alcohol of the formula:

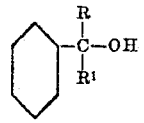

wherein R is an alkyl group having 1 to 3 carbons and $R^1$ is from the group consisting of hydrogen and alkyl groups having 1 to 3 carbons as a component of the working solvent mixture.

References Cited in the file of this patent

UNITED STATES PATENTS 2,455,238    Dawsey et al. _____ Nov. 30, 1948

FOREIGN PATENTS 695,779    Great Britain _____ Aug. 19, 1953
758,235    Great Britain _____ Oct. 3, 1956

OTHER REFERENCES

Kirk-Othomer: "Encyclopaedia of Chemical Technology," 1948, vol. 2, pp. 486–489.